United States Patent
Okino et al.

(10) Patent No.: US 8,896,951 B2
(45) Date of Patent: Nov. 25, 2014

(54) MAGNETIC DISK AND MAGNETIC RECORDING/REPRODUCING APPARATUS

(75) Inventors: Takeshi Okino, Yokohama (JP); Naoko Kihara, Kawasaki (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 13/537,859

(22) Filed: Jun. 29, 2012

(65) Prior Publication Data

US 2013/0077191 A1    Mar. 28, 2013

(30) Foreign Application Priority Data

Sep. 26, 2011   (JP) .................................. 2011-209394

(51) Int. Cl.
*G11B 5/09*     (2006.01)
*G11B 5/82*     (2006.01)
*G11B 5/855*    (2006.01)
*G11B 5/74*     (2006.01)

(52) U.S. Cl.
CPC   *G11B 5/82* (2013.01); *G11B 5/855* (2013.01); *G11B 5/746* (2013.01)
USPC ........................................ 360/48; 360/135

(58) Field of Classification Search
None
See application file for complete search history.

(56) References Cited

U.S. PATENT DOCUMENTS

| | | | | |
|---|---|---|---|---|
| 7,643,235 B2 * | 1/2010 | Erden et al. | ..................... | 360/51 |
| 7,948,701 B2 * | 5/2011 | Albrecht et al. | ............... | 360/48 |
| 8,531,794 B2 * | 9/2013 | Nonaka et al. | .................. | 360/55 |
| 2010/0246062 A1 * | 9/2010 | Albrecht et al. | ............. | 360/131 |
| 2011/0267718 A1 | 11/2011 | Itakura et al. | | |

FOREIGN PATENT DOCUMENTS

| | | |
|---|---|---|
| JP | 2001-189014 | 7/2001 |
| JP | 3576056 | 7/2004 |
| JP | 2006-79827 | 3/2006 |

OTHER PUBLICATIONS

Office Action dated Aug. 27, 2013 in counterpart Japanese Patent Application No. 2011-209394 and English-language translation thereof.

* cited by examiner

*Primary Examiner* — Andrew L Sniezek
(74) *Attorney, Agent, or Firm* — Nixon & Vanderhye, P.C.

(57) ABSTRACT

A magnetic disk according to an embodiment includes: a plurality of data regions each including a plurality of tracks, each of the tracks being arranged to extend in a circumferential direction; a servo region provided between the data regions, the servo region extending in a radial direction, the servo region including: a plurality of guide patterns each extending in the radial direction; and at least one line of dots arranged by post patterns in the radial direction at least on a side of one of adjacent guide patterns, the post patterns being arranged in the radial direction between the adjacent guide patterns.

6 Claims, 10 Drawing Sheets

MAGNETIC DISK AND MAGNETIC RECORDING/REPRODUCING APPARATUS

CROSS-REFERENCE TO RELATED APPLICATION

This application is based upon and claims the benefit of priority from prior Japanese Patent Application No. 2011-209394 filed on Sep. 26, 2011 in Japan, the entire contents of which are incorporated herein by reference.

FIELD

Embodiments described herein relate generally to magnetic disks and magnetic recording/reproducing apparatuses.

BACKGROUND

In line with the technical trend of higher-density magnetic disks (also called hard disks), medium structures of a discrete track type in which magnetic regions generating magnetic signals are partitioned by nonmagnetic sections have been suggested. Further, bit-patterned media in which data track sections are partitioned not only by circumferential grooves but also by every data bit have been suggested. Also, there has been a suggested technique of forming and processing dots by taking advantage of the self-assembling properties of a block copolymer. However, controlling dots to be aligned in an orderly fashion is regarded as difficult particularly in a wide area. To solve this problem, a technique using guide dots and a technique of forming respective dot patterns by electron beam lithography have been suggested.

Where a self-assembled material is used, each bit pattern is formed in the following manner. A diblock copolymer solution with self-assembling capability is applied in guide patterns that are formed beforehand on a substrate surface through an electron beam lithography process or are formed in a later step. Annealing is then performed, to cause microlayer isolation between a first component aggregated into dots and a second component covering the dots. In this manner, the respective dots are self-assembled, or ideally, are aligned in a hexagonal fashion. After that, by using the difference in etching characteristics (the etching rate difference) between the first component and the second component, substrate processing is performed, with one of the first component and the second component being used as a mask. In this manner, the respective bit patterns can be formed. Here, to control the alignments of the self-assembled material, position control regions for controlling the alignments of dots and free diffusion regions for allowing the dots to be aligned in a self-assembled manner should preferably be provided on the substrate.

The range in which a self-assembled material is aligned in a self-assembled manner as described above can be restricted to a certain range by providing guide grooves or a position control region. However, the circumferential width of a guide varies with radial position in a magnetic disk. Therefore, the number of dots of a self-assembled material that can be provided in a circumferential width of a guide varies with radius. In view of this, it is inevitable that guide patterns with different widths in a circumferential direction include some portions in which the alignments of the self-assembled material are not uniform. As a result, preamble signals and burst signals generated based on the dots of the self-assembled material arranged in such an irregular fashion become uneven in terms of timing, and it becomes difficult to obtain synchronization signals in preamble sections and detect phase differences in burst sections of a phase difference type.

BRIEF DESCRIPTION OF THE DRAWINGS

FIGS. 2(a) through 2(f) are cross-sectional views for explaining the procedures for manufacturing the magnetic disk according to the first embodiment;

FIGS. 3(a) through 3(f) are cross-sectional views for explaining the procedures for manufacturing the magnetic disk according to the first embodiment;

FIGS. 4(a) through 4(f) are cross-sectional views for explaining the procedures for manufacturing the magnetic disk according to the first embodiment;

FIGS. 5(a) through 5(c) are top views of a preamble section of a resist pattern;

FIGS. 8(a) through 8(c) are top views of a preamble section of a magnetic disk in an example;

FIGS. 10(a) through 10(c) are top views of a preamble section of the magnetic disk in the comparative example.

DETAILED DESCRIPTION

A magnetic disk according to an embodiment includes: a plurality of data regions each including a plurality of tracks, each of the tracks being arranged to extend in a circumferential direction; a servo region provided between the data regions, the servo region extending in a radial direction, the servo region including: a plurality of guide patterns each extending in the radial direction; and at least one line of dots arranged by post patterns in the radial direction at least on a side of one of adjacent guide patterns, the post patterns being arranged in the radial direction between the adjacent guide patterns.

The following is a description of embodiments, with reference to the accompanying drawings.

First Embodiment

Figure 1:
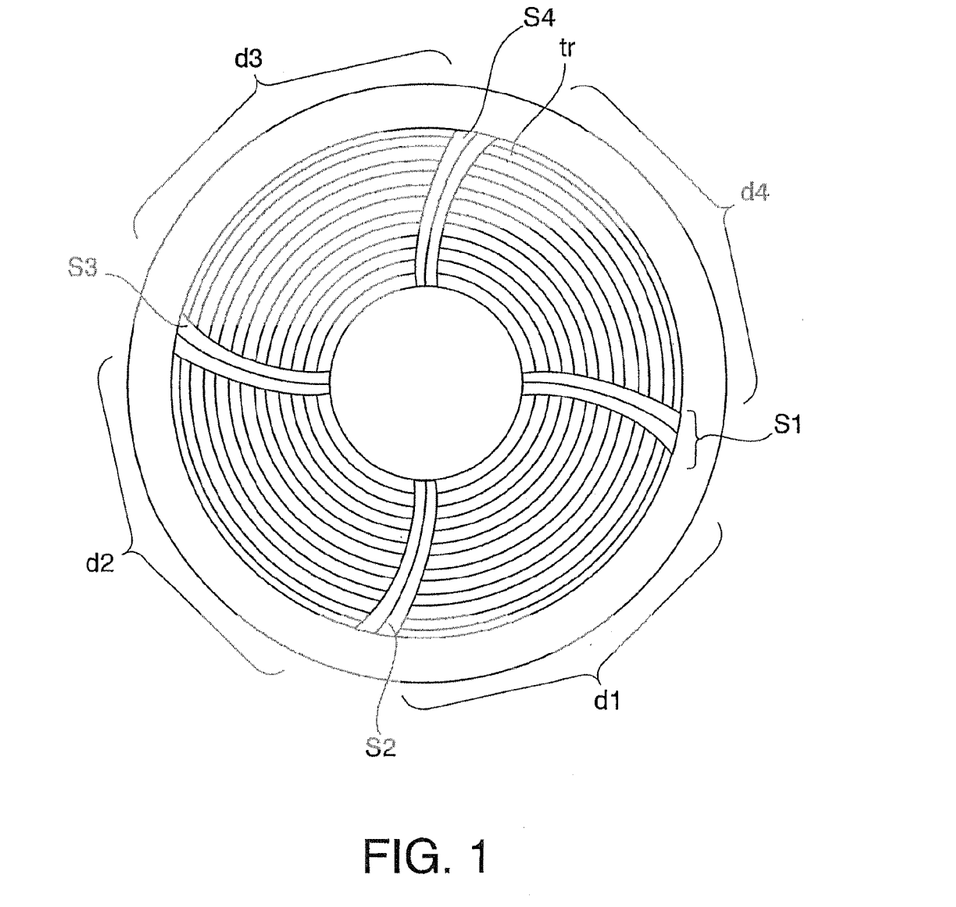
FIG. 1 is a top view of a specific example of a magnetic disk according to a first embodiment.
Figure 2:
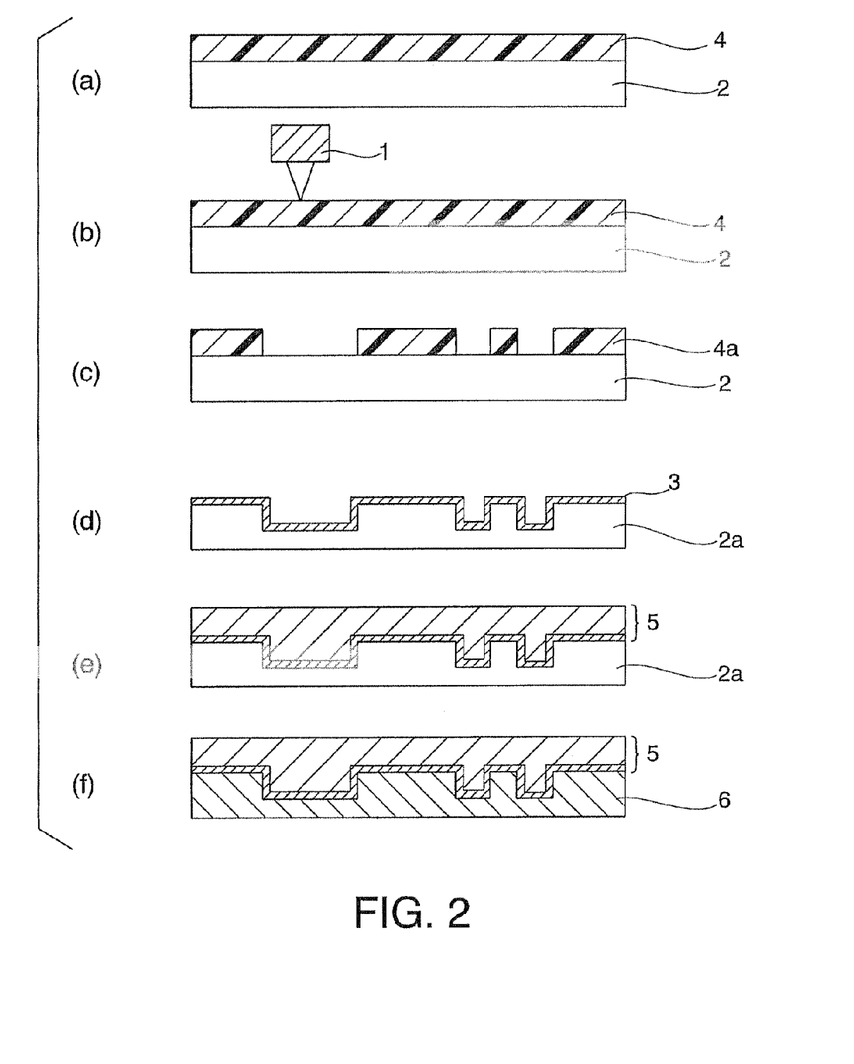

Referring to FIGS. 1 through 5(c), a magnetic disk according to a first embodiment is described. The magnetic disk of this embodiment is a bit-patterned magnetic recording medium of a processed magnetic material type. For example, the magnetic disk of this embodiment includes four data regions d1 through d4, and servo regions s1 through s4 provided between the data regions d1 through d4, as shown in FIG. 1. FIG. 1 is a top view of a specific example of the magnetic disk according to the first embodiment. Each of the data regions d1 through d4 includes concentric circular tracks tr. That is, each track tr extends on the circumference of a circle. In FIG. 1, the servo regions s1 through s4 having position-control servo patterns formed therein are designed to have arc-like shapes along the trajectories of the arm. Each of the servo patterns include regions such as a preamble section for synchronization, an address section in which the servo address is written, and a burst section for position control. In the servo regions s1 through s4, the circumferential width of each servo pattern normally increases in proportion to the radius so that the transit time becomes constant at a certain number of revolutions. Also, as shown in FIG. 1, the magnetic disk has a doughnut-like shape with a hole in the middle.

Next, a method of manufacturing the magnetic disk is described. Electron beam lithography is used in manufacturing the magnetic disk. FIGS. 2(a) through 4(f) are cross-sectional views for explaining the procedures for manufacturing the magnetic disk of this embodiment.

First, a photosensitive resin (hereinafter referred as a resist) 4 is applied onto a substrate 2 (see FIG. 2(a)). As shown in FIG. 2(b), the resist 4 is exposed by an electron beam emitted from an electron beam irradiating system 1. At this point, latent images of post patterns or guide patterns to be used for controlling the alignments of dots of a self-assembled material in a later step are formed. To form a pattern of a doughnut-shaped magnetic disk, the electron beam irradiating system 1 preferably includes a moving mechanism to move the stage in a horizontal direction and a rotating mechanism to rotate the stage. In a case where a self-assembled material is used, guide grooves and post patterns for controlling the alignments of the self-assembled material can be formed by electron beam lithography.

After that, the resist 4 is developed with a developer, to form a resist pattern 4a serving as a resist master (see FIG. 2(c)). A preamble section of the resist pattern 4a formed in the above manner is as shown in FIGS. 5(a) through 5(c), for example. FIGS. 5(a) through 5(c) are top views of a preamble section of the resist pattern 4a. FIG. 5(a) shows an inner circumferential portion of the preamble section. FIG. 5(b) shows a middle circumferential portion. FIG. 5(c) shows an outer circumferential portion. Guide patterns 30 extend in a direction intersecting with the direction (the circumferential direction or the track longitudinal direction) in which the respective tracks of the data regions extend. As can be seen from FIGS. 5(a) through 5(c), in each of the circumferential portions, post patterns 32 are formed in the regions interposed between the guide patterns 30. Those post patterns 32 are regularly arranged in the direction in which edges 30a of the guide patterns 30 extend. In the electron beam lithography process, blanking is performed at regular intervals so that the distances d from one of the facing edges of each two adjacent guide patterns 30 to the corresponding post patterns 32 are the same in any radial position. As long as the distances from the edge of one of each two adjacent guide patterns 30 to the corresponding post patterns 32 are the same, the distances from the edge of the other guide pattern 30 and the shape are not limited. The post patterns 32 formed in each region between the adjacent guide patterns 30 can be arranged in a line from the inner to outer circumferential portions, as shown in FIGS. 5(a) through 5(c). Alternatively, the post patterns 32 cannot exist in some of the regions in the inner circumferential portion. Also, the post patterns 32 can be arranged in two or more lines.

In the above described manufacturing procedures, a positive resist is used. However, a negative resist can be used. In that case, the electron beam irradiation portions and the non-irradiation portions are reversed, or the patterns are reversed in a later step. Also, post baking can be performed prior to the development of the resist 4, and processing with a rinse solution can be further performed after the development.

With the resist pattern 4a of the resist master serving as a mask, etching is performed on the substrate 2, to form a guide pattern master 2a. At this point, the substrate 2 can have films with appropriate etching rates for pattern transfers, and, based on the resist pattern 4a, patterns can be transferred onto those films. After the residues of the resist pattern 4a used as the etching mask are removed by oxygen RIE (Reactive Ion Etching) or the like, a Ni conductive layer 3 is formed on the guide pattern master 2a by sputtering (see FIG. 2(d)). Electroforming is performed based on the conductive layer 3, to form a Ni father stamper 5 having concavities and convexities that are the reverse of those of the guide pattern master 2a (see FIG. 2(e), the conductive layer 3 being part of the stamper 5).

After the guide pattern master 2a is detached from the father stamper 5, electroforming is performed, to duplicate the father stamper 5. In this manner, a Ni mother stamper 6 having the same concavities and convexities as those of the guide pattern master 2a is formed (see FIG. 2(f)).

Figure 3:
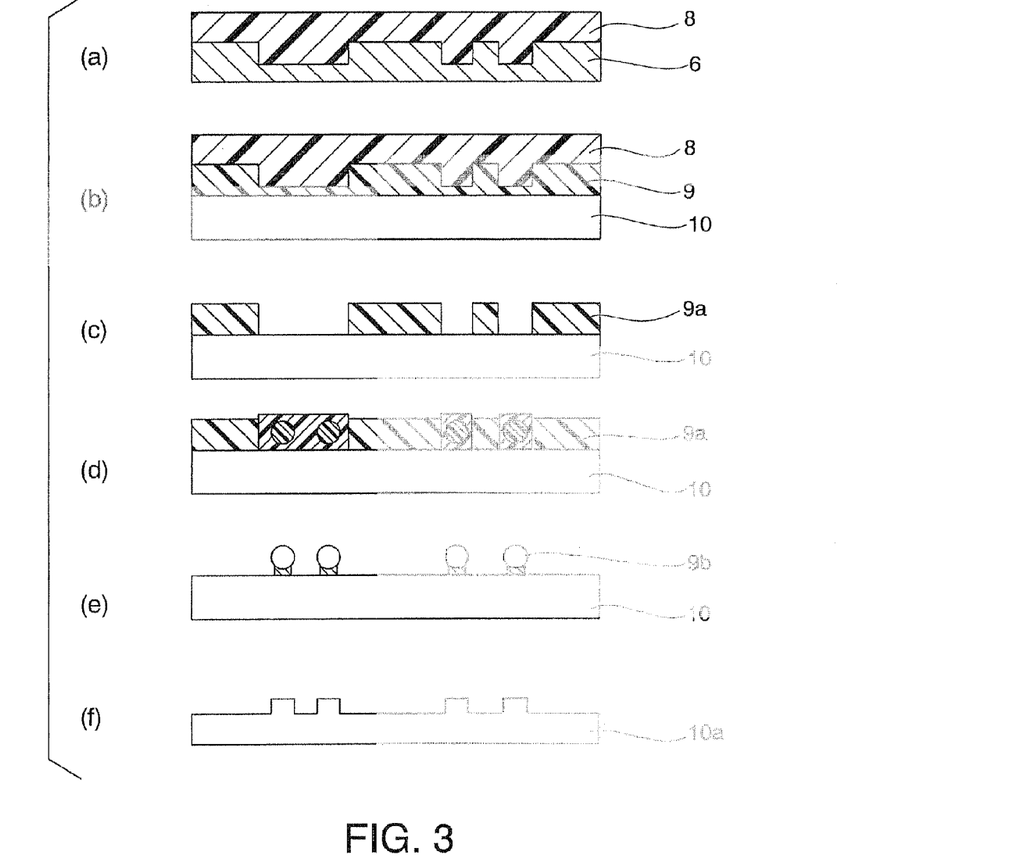
Figure 4:
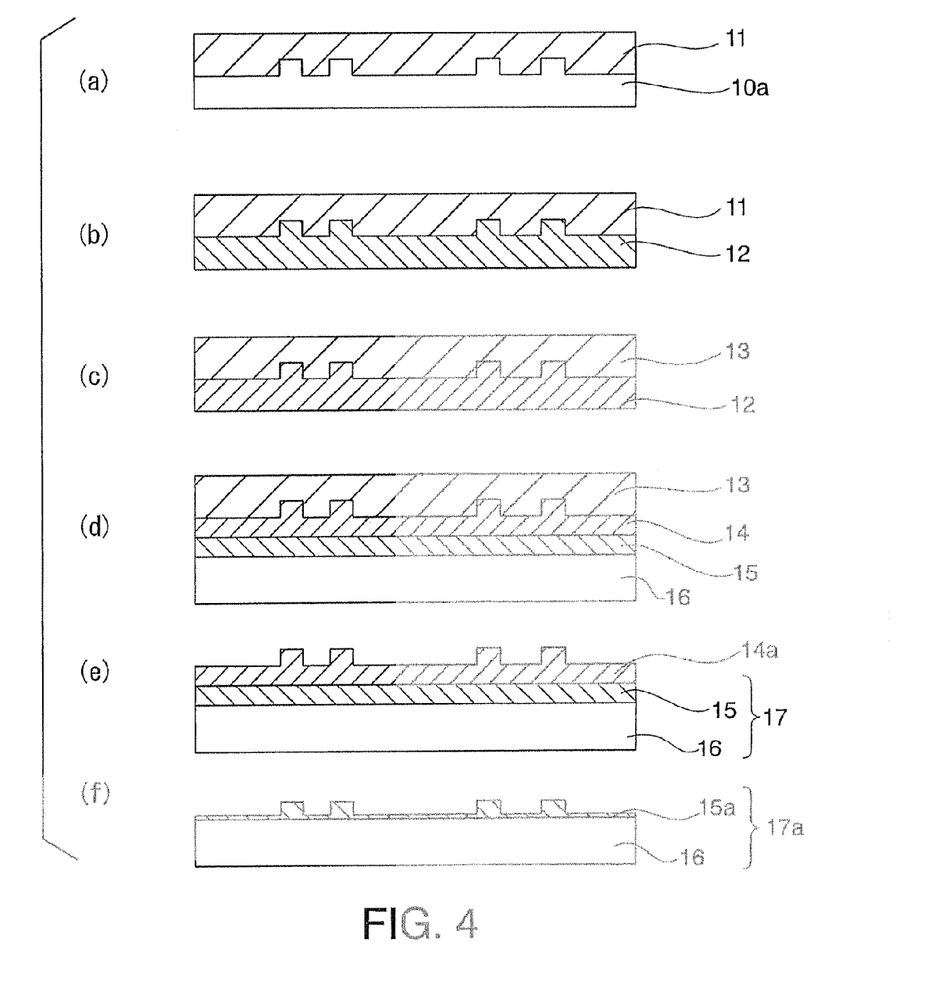
Figure 5:
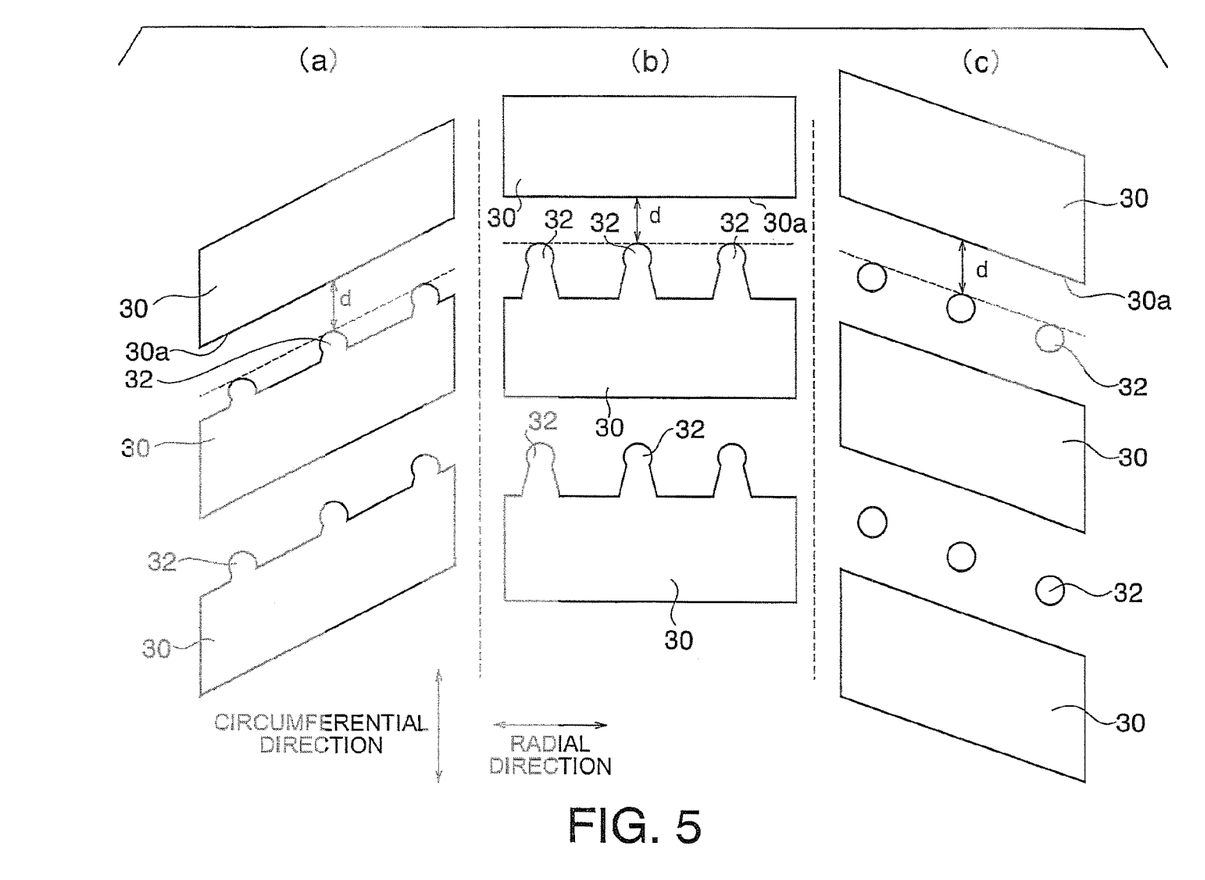

After the father stamper 5 is detached from the mother stamper 6, injection molding is performed on the mother stamper 6, to form a resin stamper 8 (see FIG. 3(a)).

A Si substrate 10 having a photo polymer material layer 9 applied onto the upper face thereof is then prepared. After the mother stamper 6 is detached from the resin stamper 8, UV (UltraViolet) imprinting is performed on the photo polymer material layer 9 with the resin stamper 8 (see FIG. 3(b)). Oxygen RIE is performed on the photo polymer material remaining on the imprinted portions on the Si substrate 10, to expose the surface of the Si substrate 10. In this manner, a photo polymer pattern 9a is obtained (see FIG. 3(c)).

A diblock copolymer solution is then applied to the concave portions of the photo polymer pattern 9a, and is subjected to annealing. In this manner, the diblock copolymer solution is self-assembled (see FIG. 3(d)). By using the difference in etching rate between a first component that is aggregated into dots and has a high etching rate, and a second component that covers the dots and has a low etching rate, oxygen RIE is performed so as to leave a pattern 9b having the dots formed thereon (FIG. 3(e)). After that, with the pattern 9b serving as a mask, $CF_4$ or oxygen RIE is performed on the Si substrate 10, to process the Si substrate 10. The pattern 9b is then removed, to turn the Si substrate 10 into a Si master mold 10a (FIG. 3(f)). It should be noted that films with appropriate etching rates for pattern transfers can be formed on the surface of the Si substrate 10 at this point, and, based on the self-assembled dot pattern 9b, patterns can be transferred onto those films.

A conductive film is then formed on the surface of the Si master mold 10a, and Ni electroforming is performed, to form a Ni father stamper 11 (FIG. 4(a)). After the Si master mold 10a is detached from the father stamper 11, electroforming is performed, to duplicate the father stamper 11. In this manner, a Ni mother stamper 12 is obtained (FIG. 4(b)).

Injection molding is then performed on the mother stamper 12, to form a resin stamper 13 (FIG. 4(c)).

A magnetic disk substrate 17 having a magnetic layer 15 formed on the upper face of a substrate 16 is then prepared, and a photo polymer material 14 is applied onto the magnetic layer 15. By using the resin stamper 13, UV imprinting is performed on the photo polymer material 14, to form a photo polymer pattern 14a (FIG. 4(d)). After the resin stamper 13 is removed, ion milling is performed on the magnetic layer 15, with the photo polymer pattern 14a serving as a mask. In this manner, a magnetic disk 17a having a magnetic pattern 15a formed on the magnetic layer 15 is obtained (FIGS. 4(e) and 4(f)). It should be noted that a protection film can be applied onto the magnetic pattern 15a, or the concave portions such as grooves can be filled with a nonmagnetic material.

The shape of the pattern forming substrate 2 in this embodiment is not particularly limited, but the substrate 2 is preferably a disk-shaped substrate, such as a disk-shaped silicon wafer. Here, the disk can have notches or orientation flats formed therein. Other than that, the substrate 2 can be a glass substrate, an Al-based alloy substrate, a ceramic substrate, a carbon substrate, a compound semiconductor substrate, or the like. As a glass substrate, an amorphous glass or a crystallized glass can be used. Examples of amorphous glasses include soda-lime glasses and aluminosilicate glasses. Examples of crystallized glasses include lithium-based crystallized glasses. As for a ceramic substrate, it is possible to use a sintered compact containing aluminum oxide, aluminum nitride, or silicon nitride as a main component, or a fiber-reinforced sintered compact containing such a main component. As for a compound semiconductor substrate, it is possible to use GaAs, AlGaAs, or the like.

The magnetic disk 17a has a disk-like shape, or more particularly, a doughnut-like shape, in view of the disk format, but the size of the magnetic disk 17a is not particularly limited by the format. However, the size of the magnetic disk 17a is preferably 3.5 inches or smaller so that the irradiating time with an electron beam does not become too long. More preferably, the size of the magnetic disk 17a is 2.5 inches or smaller so that the pressing force to be applied at the time of imprinting does not become too great. Also, only one of the surfaces of the magnetic disk 17a can be used, or both of the surfaces of the magnetic disk 17a can be used.

The inside of the magnetic disk is divided into concentric ring-like tracks, and has sectors formed by partitioning the tracks at constant angles. The magnetic disk is mounted on a spindle motor and is rotated, and various kinds of digital data are recorded on and reproduced from the magnetic disk with a head. Therefore, user data tracks are provided in the circumferential direction, and servo marks for position control are provided in directions that cross each of the tracks. Each of the servo marks includes regions such as a preamble section, an address section in which track or sector number information is written, and a burst section for detecting the position of the head relative to the tracks. In addition to those regions, the servo marks can include a gap section.

To achieve a higher recording density, the track pitch is required to be narrow.

Since the in-plane sensitivity of a photosensitive resin film to be exposed is normally uniform, the stage of the electron beam irradiating system is rotated preferably while maintaining a constant line velocity. As for the stage of the electron beam irradiating system, the optical system that performs scanning with an electron beam, and the signals for operating the stage and the optical system, synchronization is required at least among the blanking points, the blanking signal, and the stage operating signal for movement control in the radial direction and the rotational direction.

The shape of each stamper used in the manufacture of the magnetic disk according to this embodiment can be a disk-like shape, a doughnut-like shape, or any other shape. The thickness of each stamper is preferably not smaller than 0.1 mm and not greater than 2 mm. If the stampers are too thin, sufficient strength cannot be achieved. If the stampers are thicker than necessary, the electroforming requires long periods of time, and the differences in film thickness become larger. The size of each stamper is preferably larger than the size of the medium, but is not particularly limited.

Second Embodiment

Figure 6:
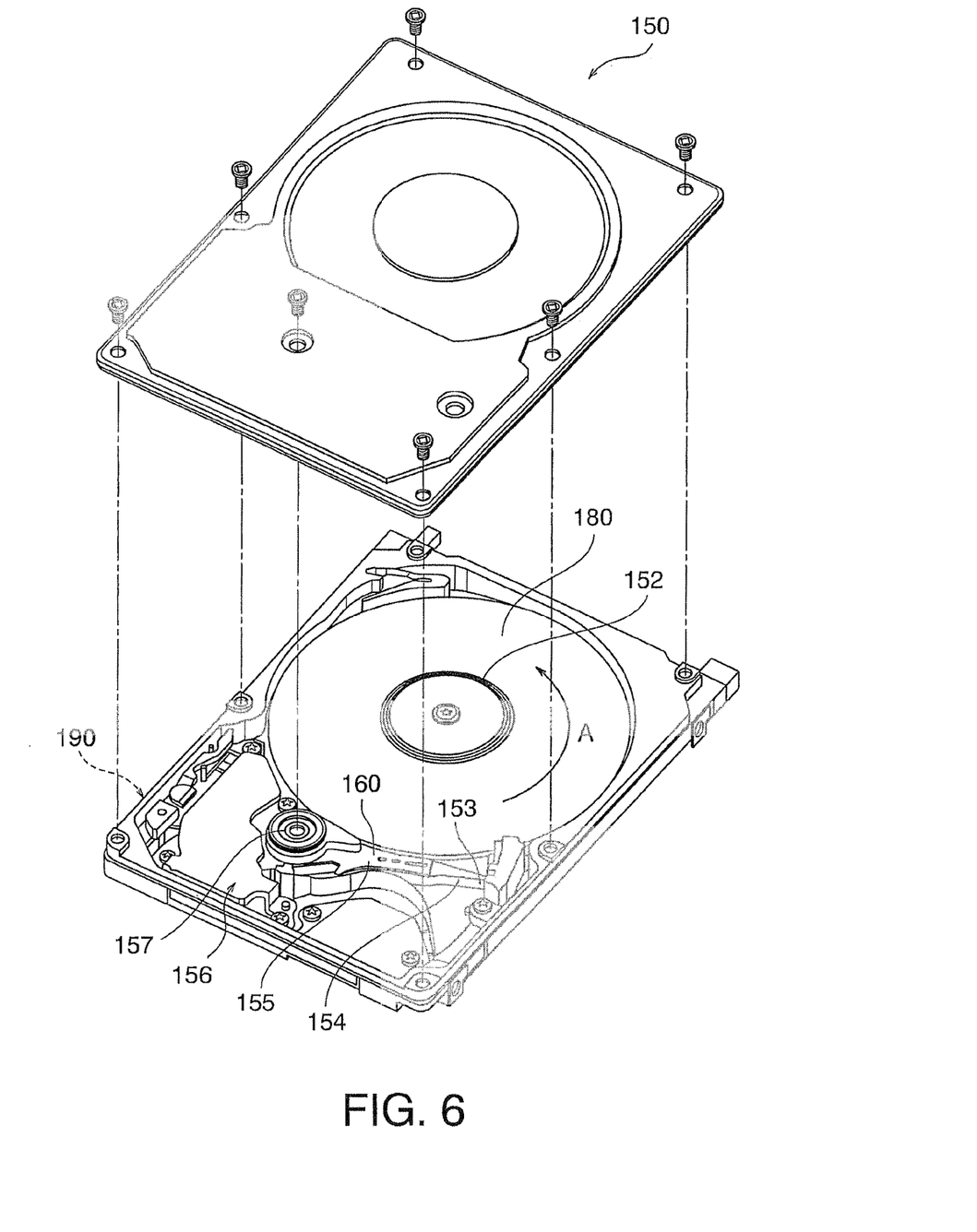
FIG. 6 is a perspective view of a magnetic recording/reproducing apparatus according to a second embodiment.

FIG. 6 shows a magnetic recording/reproducing apparatus according to a second embodiment. As shown in FIG. 6, a magnetic recording/reproducing apparatus 150 according to this embodiment is an apparatus utilizing a rotary actuator. As can be seen from FIG. 6, a recording medium disk 180 is mounted on a spindle motor 152, and is rotated in the direction of the arrow A by a motor (not shown) that responds to control signals supplied from a drive unit controller (not shown). The magnetic recording/reproducing apparatus 150 according to this embodiment can include two or more recording medium disks 180.

When the recording medium disk 180 is rotated, a pressing force generated by a suspension 154 and a pressure generated in the air bearing surface (also referred to as "ABS") of a head slider are balanced, and the air bearing surface is held, with a predetermined floating distance being kept from the surface of the recording medium disk 180.

The suspension 154 is connected to one end of an actuator arm 155 including a bobbin unit holding a drive coil (not shown). A voice coil motor 156 that is a type of linear motor is provided at the other end of the actuator arm 155. The voice coil motor 156 can be formed with the drive coil (not shown) wound around the bobbin unit of the actuator arm 155, and a magnetic circuit including a permanent magnet and an opposed yoke that are positioned to sandwich the coil.

The actuator arm 155 is held by ball bearings (not shown) provided at two locations above and below a bearing 157, and is rotatably and slidably moved by the voice coil motor 156. As a result, a magnetic recording head can be moved to any desired position on the recording medium disk 180.

Figure 7:
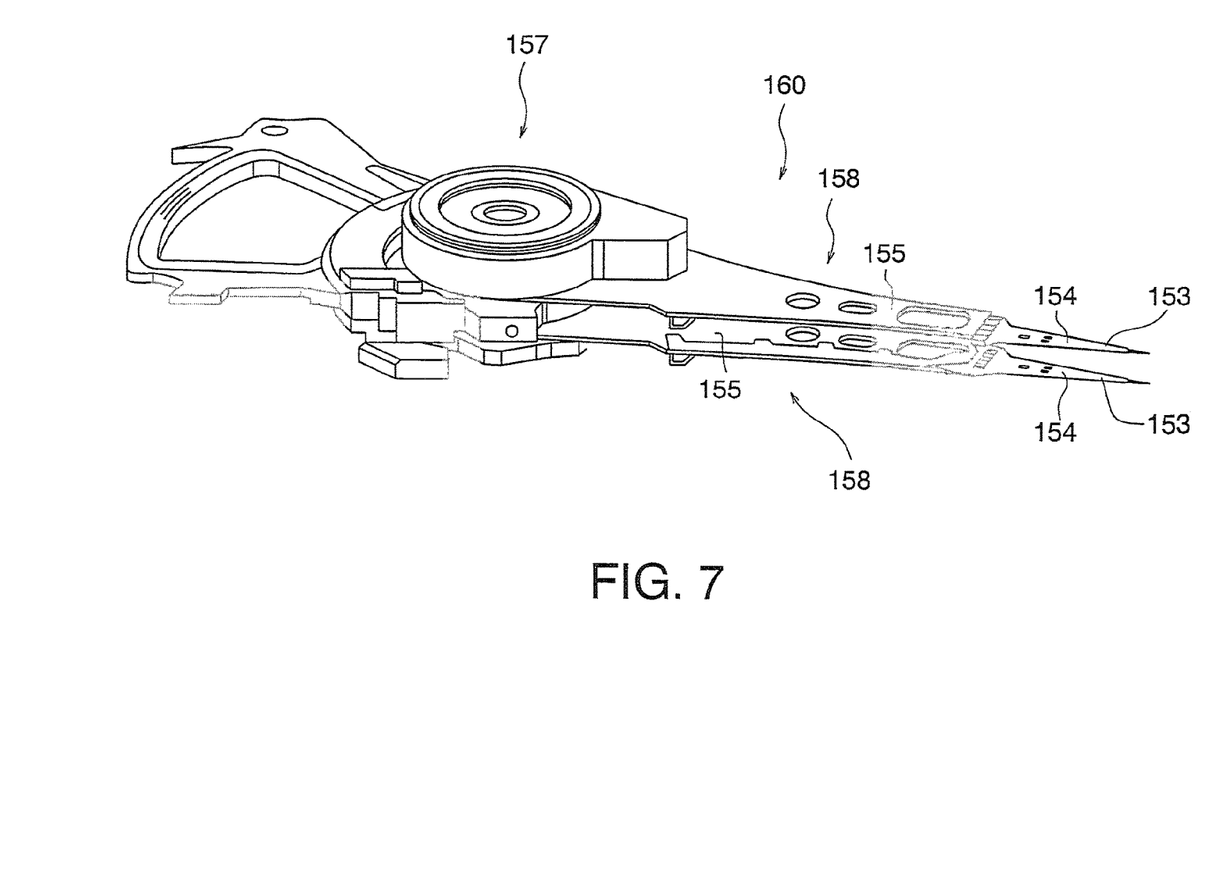
FIG. 7 is an enlarged perspective view of the magnetic head assembly in the magnetic recording/reproducing apparatus according to the second embodiment as seen from the disk side.
Figure 8:
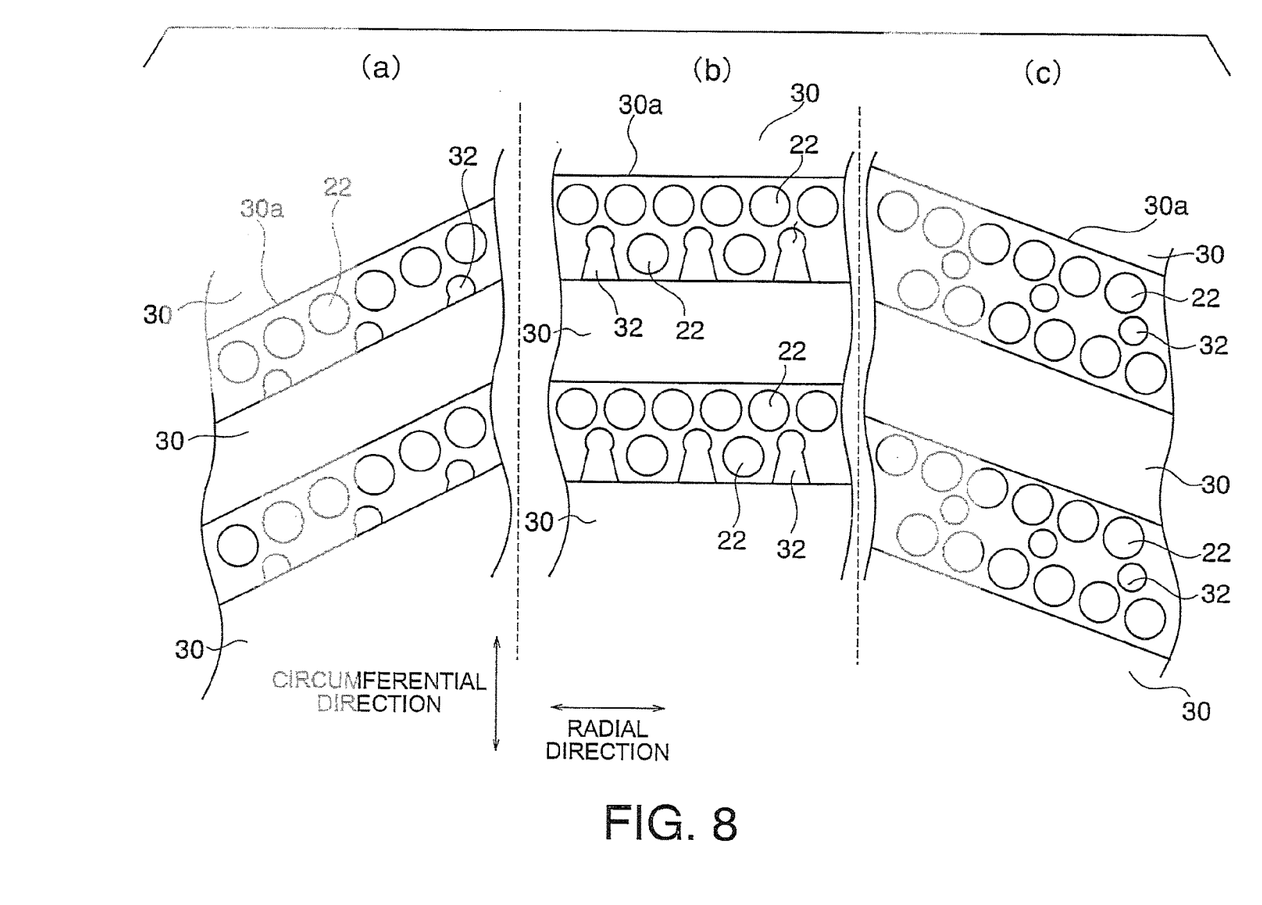
Figure 9:
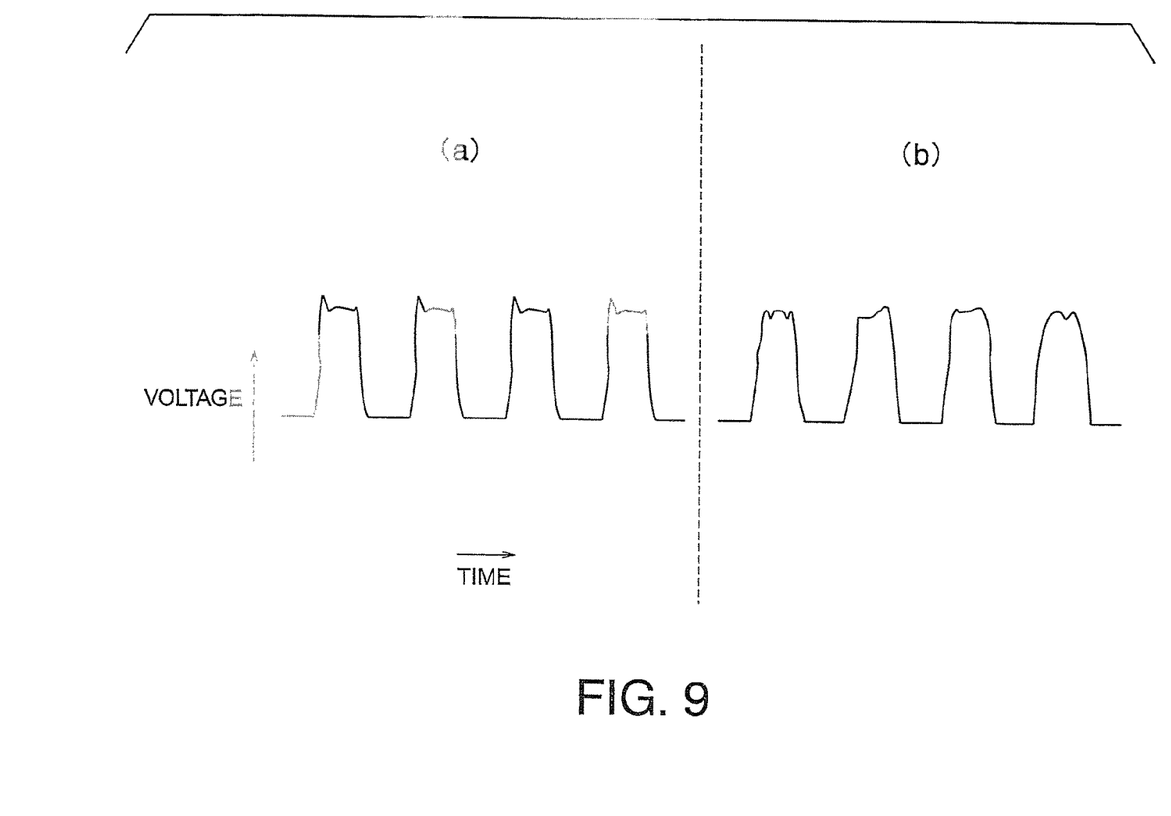
FIG. 9(a) is a waveform chart showing a reproduction signal of the magnetic disk in the example.
FIG. 9(b) is a waveform chart showing a reproduction signal of a magnetic disk in a comparative example.

FIG. 7 shows an example structure of part of the magnetic recording/reproducing apparatus according to this embodiment. Specifically, FIG. 7 is an enlarged perspective view of a magnetic head assembly 160 including the actuator arm 155 and the components located outside the actuator arm 155, as seen from the disk side. As shown in FIG. 7, the magnetic head assembly 160 includes the bearing 157, a head gimbal assembly (hereinafter referred to as "HGA") 158 extending from the bearing 157, and a supporting frame 146 that extends from the bearing 157 in the opposite direction from the extending direction of the HGA 158 and supports the coil 147 of the voice coil motor 156. The HGA 158 includes the actuator arm 155 extending from the bearing 157, and the suspension 154 extending from the actuator arm 155.

A head slider 153 having a magnetic head is attached to the outer end of suspension 154. That is, the magnetic head assembly 160 according to this embodiment includes the suspension 154 having the magnetic head mounted thereon at one end, and the actuator arm 155 connected to the other end of the suspension 154.

The suspension 154 includes a lead (not shown) for writing and reading signals, and the lead is electrically connected to each electrode of the magnetic recording head incorporated into the head slider 153. Electrode pads (not shown) are also provided in the magnetic head assembly 160.

A signal processor 190 (not shown) that performs signal writing and reading on the magnetic recording medium by using the magnetic recording head is also provided. The signal processor 190 is provided on the back face side of the magnetic recording/reproducing apparatus 150 shown in FIG. 6, for example. The input/output lines of the signal processor 190 are connected to the electrode pads, and are thus electrically bonded to the magnetic recording head.

Example

In the following, an example is described.

Referring to FIGS. 2(a) through 5(c) and FIG. 8, a magnetic disk according to the example is described.

In the manufacture of the magnetic disk of this example, an electron beam irradiating system is used. This electron beam irradiating system includes an electron gun, a condenser lens, an objective lens, and an electron gun emitter of a ZrO/W thermal field emission type that includes a blanking electrode and a deflector. The electron beam accelerating voltage is 100 kV.

Meanwhile, a positive electron beam resist is diluted with anisole, and is filtered through a 0.2 μm membrane filter. The filtered resist is spin-coated on a substrate 2 that has been subjected to HMDS processing and is a 6-inch silicon wafer. After that, 3-minute prebaking is performed on the substrate 2 at 200° C. As a result of this, a resist 4 of 0.04 μm in film thickness is formed on the substrate 2 (see FIG. 2(a)).

This substrate 2 was transported to a predetermined position on the stage of the above described electron beam irradiating system, and exposure was performed in vacuum, to obtain a concentric circle pattern that satisfies the following conditions (see FIG. 2(b)):

radius of the exposed portions: 14 mm to 28 mm
sectors per track: 200
preamble patterns per sector: 100
preamble line widths in the circumferential direction: 50 nm (in the inner circumferential area) to 100 nm (in the outer circumferential area)
feed per revolution: 5 nm
line velocity 1 m/s (constant)

During one revolution, a concentric circle was drawn while the deflection was gradually increased. To form preamble patterns in the inner circumferential area, electron beam irradiation was normally performed for 40 nsec, and was then stopped for 60 nsec. This was repeatedly performed. In the outer circumferential area, electron beam irradiation was performed for 85 nsec, and was then stopped for 115 nsec. This was also repeatedly performed. However, to form post patterns for position control to align a self-assembled material in a later step, electron beam irradiation was performed in a different irradiation pattern from the above in three of every fourteen rotations. In this irradiation pattern, after electron beam irradiation is performed for 25 nsec, the electron beam irradiation is stopped for 40 nsec, and is then resumed. By performing electron beam irradiation in this manner, latent images of post patterns 32 and guide patterns 30 are formed on the resist 4. After that, the resist 4 is developed with a developer, to form a resist pattern 4a serving as a resist master (see FIG. 2(c)). FIGS. 5(a) through 5(c) are top views of a preamble section of the resist pattern 4a formed in the above manner. FIG. 2(c) shows a cross-section of the resist pattern 4a. In each circumferential portion, post patterns 32 are formed in regions sandwiched by guide patterns 30. The distances d from one of the facing edges of each two adjacent guide patterns 30 to the corresponding post patterns 32 are the same, regardless of the radius value. That is, the distances d are the same on any circumference.

With the resist pattern 4 of the resist master serving as a mask, etching was performed, to form a guide pattern master 2a (see FIG. 2(d)).

Ni was sputtered onto the guide pattern master 2a, to form a conductive film 3. Ni electroforming was performed based on the conductive film 3, to obtain a Ni father stamper having concavities and convexities that are the reverse of those of the guide pattern master 2a (see FIG. 2(e)). The sputtering was performed by applying a DC power of 400 W in a chamber having a pressure adjusted to 1 Pa through argon gas introduction. The electroforming was performed for 90 minutes, using a nickel sulfamate plating solution (see FIG. 2(e)). The thickness of the electroformed film 5 was 300 μm. The conditions for the electroforming bath are as follows:

nickel sulfamate: 600 g/L
boric acid: 40 g/L
surfactant (sodium lauryl sulfate): 0.15 g/L
solution temperature: 55° C.
pH: 4.0
current density: 20 A/dm$^2$ After that, the resist residues were removed by an oxygen plasma ashing technique. In the oxygen plasma ashing, 20-minute plasma ashing was performed at 100 W in a chamber having a pressure adjusted to a vacuum of 4 Pa through oxygen gas introduction at 100 ml/min (not shown). In this manner, the Ni father stamper 5 was obtained.

After that, electroforming was performed to duplicate the father stamper 5. In this manner, a Ni mother stamper 6 having the same concavities and convexities as those of the guide pattern master 2a was obtained (see FIG. 2(f)).

Injection molding was then performed on the mother stamper 6, to obtain a resin stamper 8 (see FIG. 3(a)).

By using the resin stamper 8, imprinting was then performed on an acrylic photo polymer material 9 applied onto a Si substrate 10 through UV irradiation (see FIG. 3(b)). After that, etching was performed on the residual photo polymer material by oxygen RIE, to obtain a photo polymer pattern 9a including post patterns and guide patterns (see FIG. 3(c)).

Further, a PS-PDMS (polystyrene-polydimethylsiloxane) diblock copolymer solution is applied to the concave portions of the photo polymer pattern 9a. Annealing is then performed to make the PS-PDMS diblock copolymer solution self-assembled (see FIG. 3(d)).

By using the difference in etching rate between a first component that is aggregated into dots and has a high etching rate, and a second component that covers the dots and has a low etching rate, oxygen RIE is performed so as to leave a pattern 9b having the dots formed thereon (FIG. 3(e)). The guide patterns and post patterns are transferred but the guide materials and the post materials may etch by oxygen RIE. After that, with the pattern 9b serving as a mask, CF$_4$ or oxygen RIE is performed on the Si substrate 10, to process the Si substrate 10. The pattern 9b is then removed, to turn the Si substrate 10 into a Si master mold 10a (FIG. 3(f)). As shown in FIGS. 8(a) through 8(c), the dots formed here extend along one side of an edge 30a of each guide line 30 of the preamble sections. This is because the post patterns 32 are formed in the regions between the adjacent guide lines 30, and are regularly arranged at a pitch of 70 nm in the extending direction of the edges 30a of the guide lines 30. The dot pitch was 35 nm. Also, the distances from the guide lines 30 to the centers of the respective dots 22 were approximately 19 nm, and the standard deviation thereof was 1 nm or less. It should be noted that the diameter of each of the dots 22 is larger than the diameter of each upper semicircular portion of the post patterns 32 (or the diameter of each circle if each of the post patterns 32 has a circular shape). This is because, if the size of each post pattern 32 is equal to or larger than the size of each dot 22, it is difficult for the post patterns 32 to trap the dots 22, and the nonmagnetic regions become larger. The diameter of each of the dots 22 in this example was 30 nm, while the diameter of each of the upper semicircular portions of the post patterns 32 was 25 nm. Also, the pitch of the post patterns 32 or the distance between each two adjacent post patterns 32 in the extending direction of the edges 30a is preferably two to eight times as long as the pitch of the dots 22. If the pitch of the post patterns 32 is narrower than twice the pitch of the dots 22, it is difficult to form the post patterns 32 by lithography in the first place, and the alignments of the self-assembled dots are easily disturbed by variations in position and size among the post patterns 32. If the distance between each two adjacent post patterns 32 is much wider than the dot pitch, it is difficult to control the aligned positions of the self-assembled dots as originally intended. Also, the post patterns 32 can be made of a nonmagnetic material. The nonmagnetic material can be glass, $SiO_2$, SOG (Spin On Glass), or C. FIGS. 8(a) through 8(c) are top views of a preamble section. Specifically, FIG. 8(a) shows an inner circumferential portion, FIG. 8(b) shows a middle circumferential portion, and FIG. 8(c) shows an outer circumferential portion.

Further, a conductive film was formed on the surface of the Si master mold 10a, and Ni electroforming was performed, to form a Ni father stamper 11 (see FIG. 4(a)). After that, electroforming was performed, to duplicate the father stamper 11. In this manner, a Ni mother stamper 12 was obtained (see FIG. 4(b)).

Injection molding was then performed on the mother stamper 12, to form a resin stamper 13 (see FIG. 4(c)).

A magnetic disk substrate 17 having a magnetic layer 15 formed thereon is prepared, and an acrylic photo polymer material 14 is applied onto the magnetic layer 15. By using the resin stamper 13, UV imprinting is performed on the acrylic photo polymer material 14 (see FIG. 4(d). In this manner, a photo polymer pattern 14a is formed in the photo polymer material 14. With the photo polymer pattern 14a serving as a mask, ion milling is performed on the magnetic layer 15. In this manner, a magnetic disk 17a having a magnetic pattern 15a formed thereon was obtained (see FIGS. 4(e) and 4(f)). A protection film (not shown) was applied onto the magnetic pattern 15a. As can be seen from the above description, the magnetic pattern 15a includes dots and post patterns corresponding to the dots 22 and the post patterns 32, as shown in FIGS. 8(a), 8(b), and 8(c).

The magnetic disk 17a formed as above was then incorporated into a magnetic recording/reproducing apparatus as shown in FIG. 6, and a preamble signal was read at a radius of 20 mm with a magnetic head having a read width of 75 nm. As a result, a signal that had uniform shapes in the signal waveform was obtained. The signals also had uniform timings, uniform signal intensity peaks, and uniform peak positions.

Also, another magnetic disk was formed. In this magnetic disk, a magnetic pattern with dots and post patterns corresponding to the dots 22 and the post patterns 32 as shown in FIGS. 8(a), 8(b), and 8(c) is also formed in stripe burst sections of a phase difference type as well as in the preamble sections. Each of the stripe burst sections is formed with two kinds of angular components with respect to the circumferential direction. This magnetic disk was incorporated into a magnetic recording/reproducing apparatus, and a servo signal of a phase difference type was read from the burst sections. Positional information (a phase signal) was also obtained from the servo signal of the phase difference type in a preferred manner.

Comparative Example

In the same manner as in the example, latent images of guide patterns 30 are formed on a resist 4. However, an electron beam lithography process in the preamble patterns is performed without the special irradiation in the three rotations out of every fourteenth rotations, so as not to form post patterns. After that, the resist 4 is developed with a developer, to form a resist pattern serving as a resist master (see FIG. 2(c)). Thereafter, the same procedures as those of the example are carried out, to form a magnetic disk of a comparative example. A protection film was applied onto the magnetic pattern as in the example.

Figure 10:
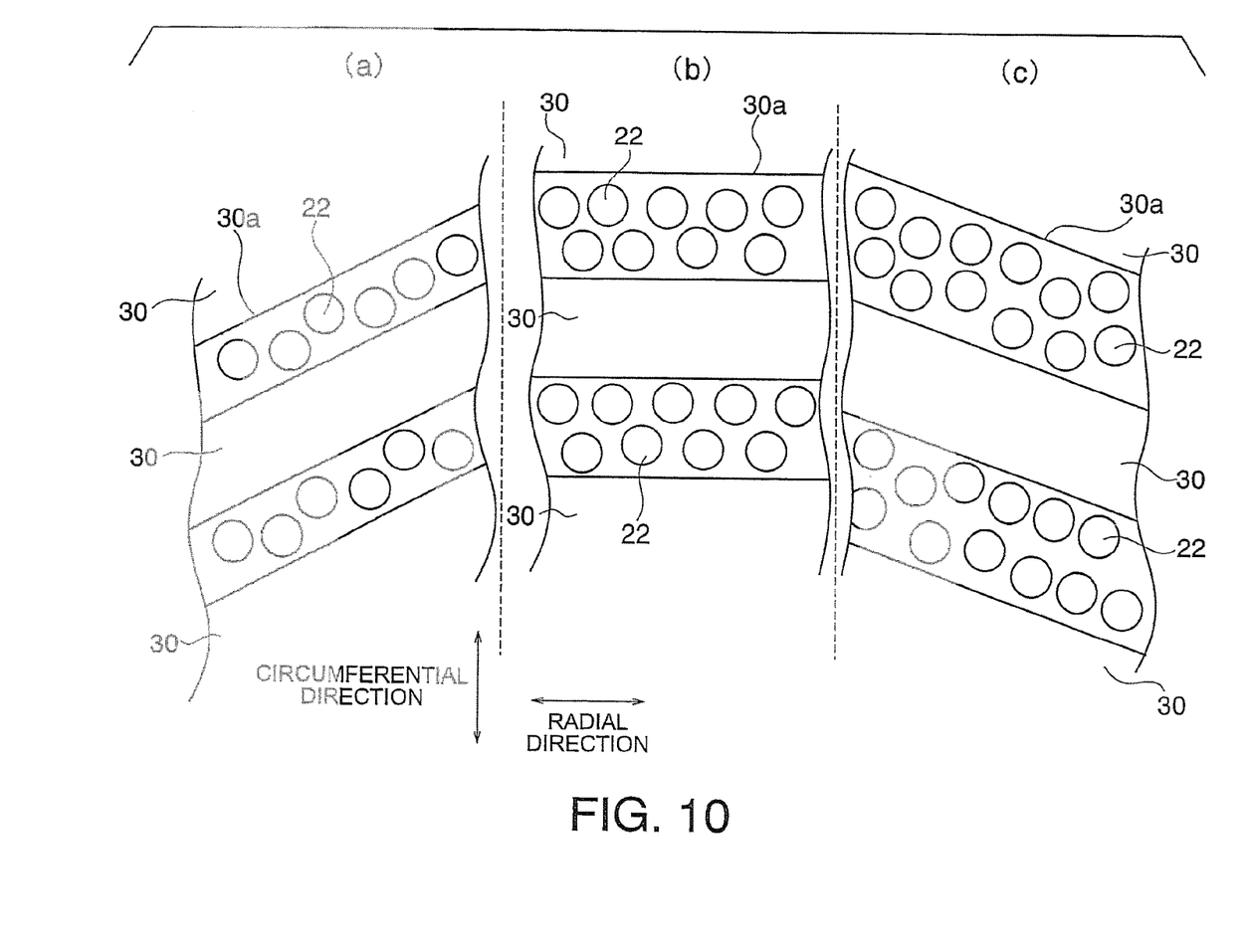

FIGS. 10(a) through 10(c) are top views of a preamble section of the magnetic disk of the comparative example. Specifically, FIG. 10(a) shows an inner circumferential portion, FIG. 10(b) shows a middle circumferential portion, and FIG. 10(c) shows an outer circumferential portion. In the inner circumferential portion and the outer circumferential portion of each preamble section of the magnetic disk of the comparative example, dots 22 were not formed to extend along one side of each edge 30a of the guide lines 30 in the preamble sections, not as in the example.

Further, the magnetic disk of the comparative example was incorporated into the magnetic recording/reproducing apparatus shown in FIG. 6, and a preamble signal was read at a radius of 20 mm with a magnetic head having a read width of 75 nm. As a result, a signal that had irregular shapes in the signal waveform obtained from each pattern was detected. The signal also had irregular signal intensity peaks and irregular peak positions. Therefore, the signal was not obtained in good timing, and a synchronization signal as a preamble was not obtained.

In the first embodiment and the example, the preamble sections have been mainly described. However, the first embodiment and the example can be applied to burst section of a phase difference type, or can be applied to burst sections of the ABCD type. Also, the first embodiment and the example can be applied to patterns formed in the cross-track direction or patterns formed in the down-track direction. As for the self-assembled material, it is possible to use PS-b-PMMA (polystyrene-block-polymethylmethacrylate) or PS-b-PEO (polystyrene-block-polyethyleneoxide), other than PS-b-PDMS. The post patterns provided for aligning the self-assembled material can be chemically formed, and can be designed so that self-assembled material dots trapped therein make other self-assembled materials aligned. Also, the sizes of the post patterns can be varied with radial position or pattern type.

As described so far, any of the first and second embodiment and the example can provide a magnetic disk of a bit-patterned medium type that appropriately achieves synchronization in preamble patterns and detects phase differences in phase-difference burst sections. Also, a magnetic recording/reproducing apparatus having such a magnetic disk mounted thereon can be obtained.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:
1. A magnetic disk comprising:
  a plurality of data regions each including a plurality of tracks, each of the tracks extending in a circumferential direction;
  a servo region provided between the data regions, the servo region extending in a radial direction intersecting with the circumferential direction, the servo region including a plurality of guide areas each extending continuously in the radial direction, a plurality of grooves each provided between adjacent guide areas and extending continuously in the radial direction, and one line of dots provided in each of the grooves and arranged in line by post patterns in the radial direction at least on a side of one of the adjacent guide areas, the post patterns being provided in each of the grooves and being regularly arranged in the radial direction, the post patterns in each of the grooves being located on one side of the one line of dots opposite from the one of the adjacent guide areas, the dots being made of magnetic material, wherein a distance from the guide area that the dots are arranged on the side thereof to the post pattern is constant for radial positions of the magnetic disk.

2. The disk according to claim 1, wherein a size of each of the dots is larger than a size of the post pattern.

3. The disk according to claim 1, wherein the servo region includes a preamble section, with the guide areas and the post pattern being formed in the preamble section.

4. The disk according to claim 1, wherein the servo region includes a burst section, with the guide areas and the post pattern being formed in the burst section.

5. The disk according to claim 1, wherein the post pattern is made of a nonmagnetic material.

6. The disk according to claim 5, wherein the nonmagnetic material is one of glass, SiO2, SOG, and C.

* * * * *